C. A. MILLS.
Coffee Roaster.
No. 38,320. Patented April 28, 1863.
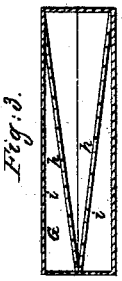
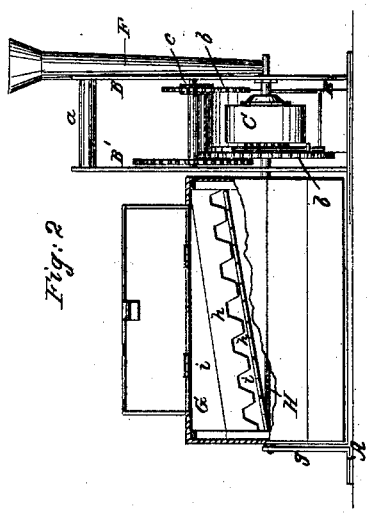
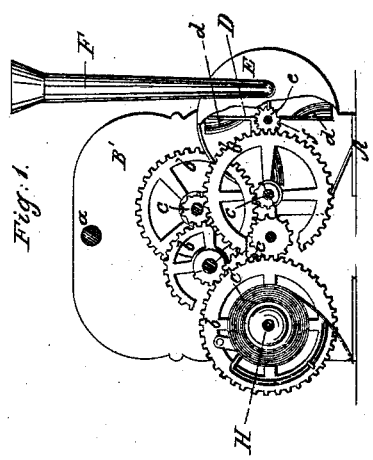

United States Patent Office.

C. A. MILLS, OF HAZEL GREEN, WISCONSIN.

IMPROVEMENT IN COFFEE-ROASTERS.

Specification forming part of Letters Patent No. 38,320, dated April 28, 1863.

*To all whom it may concern:*

Be it known that I, C. A. MILLS, of Hazel Green, in the county of Grant and State of Wisconsin, have invented a new and Improved Coffee-Roaster; and I do hereby declare that the following is a full, clear, and exact description of the same, reference being had to the accompanying drawings, making a part of this specification, in which—

Figure 1 is an end view of my invention, the portion of the framing nearest the eye being removed, as indicated by the line $x\,x$, Fig. 2; Fig. 2, a front view of the same; Fig. 3, a detached longitudinal section of the roting roasting-vessel.

Similar letters of reference indicate corresponding parts in the several figures.

To enable those skilled in the art to fully understand and construct my invention, I will proceed to describe it.

A represents a horizontal frame or base, which supports the whole device, and which has two vertical plates, B B′, secured to it at a proper distance apart. These plates are connected at their upper parts by a cross-rod, $a$, and they serve to support the clock mechanism, which is composed of a spring, C, and a train of wheels and pinions, $b\,c$. These parts in themselves considered possess no novelty, and, therefore, do not require a special description, a simple clock-movement being well known.

D represents a fan, which is inclosed within a case, E. This fan may be constructed in the same way as those which are used for blowers in various mechanical devices—to wit, by attaching wings or blades $d$ radially to a shaft, $e$. (See Fig. 1.) On the fan shaft $e$ there is placed a pinion, $f$, which gears into a wheel, $b$, of the clock mechanism or movement. F is a tube, the lower end of which communicates with the fan-case E, the upper end extending some distance above the plates B B. (See Figs. 1 and 2.)

G represents the coffee-roasting vessel, which is of polygonal form and fitted on a shaft, H, which has one of its bearings in the plate B′, and the other in an upright, $g$, on the frame or base A. The frame or base is open at its center, it being simply a frame. The vessel G has a horizontal position, and within there are secured a series of oblique plates, $h$. These plates are attached one to each side $i'$ of the vessel G and extend diagonally across them, as shown in Fig. 3. One-half of these plates $h$ are placed in an opposite position to the others, and they are each notched, as shown in Fig. 2, and project radially within the vessel G.

The device is used as follows: The vessel G is supplied with the coffee to be roasted and the spring C wound up. The device is then placed on the stove or range, the vessel G being over the opening in the top plate thereof. The vessel G is rotated by the clock mechanism, the fan D regulating the speed or serving to control the power of the spring, so that the vessel G will rotate at the proper speed and be operated a sufficient length of time to effect the desired end—to wit, the roasting of the coffee. The fan also serves to eject air upon the spring C, and the latter is thereby kept in a cool state. The air, it will be understood, enters the case E through the tube F. As the vessel G rotates the plates $h$, owing to their inclined position, as described, have a tendency, one-half of them, to move the coffee to one end of the vessel and the other half to the other end of the same, and by this means the coffee is kept well distributed in the vessel and every grain subjected to a requisite degree of heat to insure a proper roasting of the same.

The frame A and upright plates B B′ may be of cast-iron, the vessel G of sheet metal, and the wheels of the clock mechanism may be of cast or wrought metal, the teeth being cut. I do not, however, confine myself to any particular material or mode of manufacture.

Having thus described my invention, what I claim as new, and desire to secure by Letters Patent, is—

The combination of the air entrance F and the fan D with the air-case E, the spring C, and the roasting-vessel G, as herein shown and described, so that the movement of the latter will be regulated and the spring will be kept cool, all as set forth.

C. A. MILLS.

Witnesses:
 HARRISON WEST,
 ANDREW THOMPSON.